(12) United States Patent
Uskolovsky

(10) Patent No.: US 6,220,543 B1
(45) Date of Patent: Apr. 24, 2001

(54) SAFE AND SECURE COMMERCIAL AIR TRANSPORTATION

(76) Inventor: Alexander Uskolovsky, 1348 N. Sierra Bonita Ave., #204, Los Angeles, CA (US) 90046

( * ) Notice: Subject to any disclaimer, the term of this patent is extended or adjusted under 35 U.S.C. 154(b) by 0 days.

(21) Appl. No.: 08/996,054

(22) Filed: Dec. 22, 1997

(51) Int. Cl.$^7$ .............................. B64D 3/00; B64C 37/02
(52) U.S. Cl. ................................................. 244/3; 244/16
(58) Field of Search ........................ 244/2, 118.1, 3, 244/16

(56) References Cited

U.S. PATENT DOCUMENTS

| | | | |
|---|---|---|---|
| 2,395,172 | * | 2/1946 | Dean ........................................ 244/3 |
| 2,407,634 | * | 9/1946 | Du Pont ................................... 244/3 |
| 2,443,276 | * | 6/1948 | Seevers ................................... 244/3 |
| 2,723,812 | * | 11/1955 | Hohmann ................................ 244/3 |
| 4,379,533 | * | 4/1983 | Caldwell et al. .................. 244/118.1 |
| 5,531,400 | * | 7/1996 | Demidov et al. ...................... 244/2 |
| 5,626,310 | * | 5/1997 | Kelly ...................................... 244/2 |
| 5,875,996 | * | 3/1999 | Borgia ............................... 244/118.1 |

* cited by examiner

Primary Examiner—Robert P. Swiatek

(57) ABSTRACT

The safe and secure mass commercial air transportation to eliminate or, at least, mitigate dramatically the impact of a baggage-born explosion or fire in a cargo hold of a passenger airplane, menacing technical malfunction or failure of the airplane, or a human error, and to accommodate concurrently additional passengers aboard, owing to separating the cargo hold far sufficiently beyond the airplane and further placing the cargo hold into, at least one, cargo airtrailer in the form of an immense glider(s) driven by the airplane so that baggage and cargo are carried in the airtrailer, or accommodating the passengers aboard a passenger airtrailer (glider) driven by the airplane.

13 Claims, 2 Drawing Sheets

SAFE AND SECURE COMMERCIAL AIR TRANSPORTATION

CROSS-REFERENCES TO RELATED APPLICATIONS

This invention uses the transmission of my Provisional Patent Application under the name "Safe Passenger Aerotransportation", Ser. No. 60/034,339, filing date Dec. 23, 1996.

STATEMENT REGARDING FEDERALLY SPONSORED RESEARCH OR DEVELOPMENT

Not applicable.

BACKGROUND OF THE INVENTION

1. Technical Field

This invention relates to aerotransportation, specifically to ensuring mass commercial aviation safety and security.

2. Description of the Related Art

One of the crucial areas to civil aviation overall mission is ensuring commercial aviation safety and security. In general, there is an acute need to eliminate or at least mitigate greatly the tragic consequences of airborne accidents in the form of lethal crashes. Whatever that was their reason is of no concern, be it terrorist attack, technical failure, or human error. Currently, onboard occupants (crew and passengers) of commercial flights are factual hostages of menacing airborne conditions. While even combat pilots have real chances to survive in such a situation because of parachute facilities aboard, commercial airliners are deprived of any airborne rescue means at all, despite their far bigger sizes, mass, and onboard population, dictating the high landing speed, big landing field, complicated and heavy landing gear, and superior surface qualities. Responding to growing demand for air transportation, major aircraft makers have chosen an inadequate, in terms of safety and security, path of developing even bigger airliners, thus just increasing twice . . . thrice the number of the possible hostages aboard and diminishing the survivability due to far bigger sizes and mass of the next generation of airliners. This is tantamount to a development of a single only railroad locomotive with a crew, passengers, cargo, engine, and fuel on itself, growing in size enormously as demand for railroad transportation increases.

The most frequent and dangerous menace for security is the bomb threat. According to the National Transportation Safety Board, the bomb threats only in US airports during 1993–1995 amounted to an average of 300 threats per year, almost each and every day.

Since sizes and capacity of passengers airliners, let alone the overall amount of passengers and flights, have the apparent tendency for a fast increase, consequences of realization of such bomb threats would be even more horrible than the tragic fate of Flights 103, 592, 800 and others.

This problem of prevention of catastrophic consequences from bomb explosion in cargo hold of a passenger airplane has been partially solved by two current main ways: first, seeking detection and screening of explosives while passenger and baggage processing at commercial airports, and, if unsuccessfully, second, bomb damage mitigating by use of constructive features of cargo hold to make it bomb-proof through hardening and fast decompressing.

However, both ways had and still have significant drawbacks: they are complex, expensive, though yet unreliable and ineffective.

First way of detection and screening explosives and peoples in hardly effective and reliable, in spite of huge, though vain, expenditures of time, money, and efforts, by reason of both deficiencies in methods and means of detection and screening themselves, and their not quite diligent use.

Indirectly, it has been proved by necessity of further second way for ensuring security. It is bomb damage mitigating, also ineffective and unreliable, by reason of inherent airliner being as flying fuel tanker (fuel accounts for about two thirds of the take-off weight) filled with electrical power and communicative cables, wiring, and devices. So, even the weakest initial explosion might be sufficient to detonate further catastrophic exploding with fatal damage.

System for passenger and luggage processing at commercial airports in U.S. Pat. No. 4,137,567 to Grube, Jan. 30, 1979, has all cited drawbacks of the first way. It is imperfectness of detecting methods and means themselves, including even sniffling dogs, and inadequate diligence of staff lacking vigilance owing to facing permanently a check of a multitude of passengers and baggage for limited time, comparative infrequency of real dangerous events, and very low salary.

Air cargo container with bomb damage mitigation features in U.S. Pat. No. 5,195,701 to Willan, Mar. 23, 1993, has venting device to pierce the fuselage wall of an airplane and vent shock waves and gas outside. While it is believable the device pierces the fuselage, though hardly—or even not—harmlessly for the airplane, there is no assurance that all of gas and shock waves would leave through this hole proposed, and the airplane would not undergo any dangerous impacts.

There were also different models of combat transport gliders with pure military use which performed well during WWII owing to their following features: providing mobility to ground troop units, lacking any special parachute training, to leap over natural obstacles and enemy defenses, and to be ready at once to combat, not scattered around like paratroopers landed; stealth and silence of assault to take advantage of terror and unreadiness of enemy; cheapness and ease to produce, use, and learn to use; and double or triple increase of a combat airplane capability to deliver troops and arms. However, not before or since that war such gliders have ever been used in another war, and they have never been used in civil aviation at all, let alone ensuring its security. At that time the problem of counteracting terrorist attempts of bomb exploding did not come in existence yet.

There is an apparent reason the problem of onboard occupants' survivability in crashes has not been solved: while mass passenger aerotransportation has comparatively short history of about 40 years, and terrorist bomb threats have even shorter one, these crashes are rather seldom. So, unsteady efforts to resolve the problem are really cyclical greatly boosting just after a latest crash and fading in time.

It is understandable, because there is no real commercial profit from enhancing aviation safety and security to be driving force for such efforts, not counting reduction of insurance indemnification to families of victims. Without adequate profit, destroyed lives of these victims can hardly- or even if- move the big companies to required big investments in research and development for aviation safety and security.

The present invention, providing significant commercial profit concurrently with enhancing aviation safety and security, offers the real incentive for private sector entities to involve deeply in the vitally important part of aerotransportation improvement.

BRIEF SUMMARY OF THE INVENTION

The proposed invention for safe commercial air transportation overcomes the deficiencies of the current technology through eliminating or, at least, mitigating dramatically the consequences of airliner crashes, and provides concurrently accommodating additional passengers aboard by separating a tow airplane with engine and fuel from passengers being inside towed payload gliders forming an aerotrain with the tag airplane snatching off the landing field, delivering to destination by towing, and then releasing the single passenger and/or cargo gliders landing on their own for different local destinations or purposes, without landing there the airplane itself.

Accordingly, several main objects and advantages of my invention are its reliability, effectiveness, simplicity, and cheapness, providing satisfaction of the vital existing wants and needs of society for dependable aviation safety and security, and accompanied by: eliminating or reducing expenditures and inconvenience of long troublesome baggage check; increasing the seating capacity on the airplane; savings in costs of the baggage carriage; enlarging nonstop flight range.

Other objects and advantages are: simplicity, compactness, soundness, durability, reliability, and reparability of structure and equipment involved, long life cycle because of absence of moving parts; ease and cheapness to produce, distribute, use, train to use, and to meet service requirements; novel, reliable, and higher quality result compared to current ways of ensuring security; operability, compatibility with existing technology, and intensification of airplane use; social benefits of reducing time spent by passengers in airports and flight crews in routes; reduction of air pollution owing to decrease in needed amount of flights; profitability, unlimited market size without any legal, climatic, or economic restrictions, and a year-round demand with increasing trend since a field of uses expands and will exist for long; consumer excitement for a silent glider flight without vibration, and a possible high markup; related product addability because of ushering in a new product line; market independence because it is useful in its own rights. Further objects and advantages of my method will become apparent from a consideration of the ensuing description.

DETAILED DESCRIPTION OF INVENTION

Figure 1:
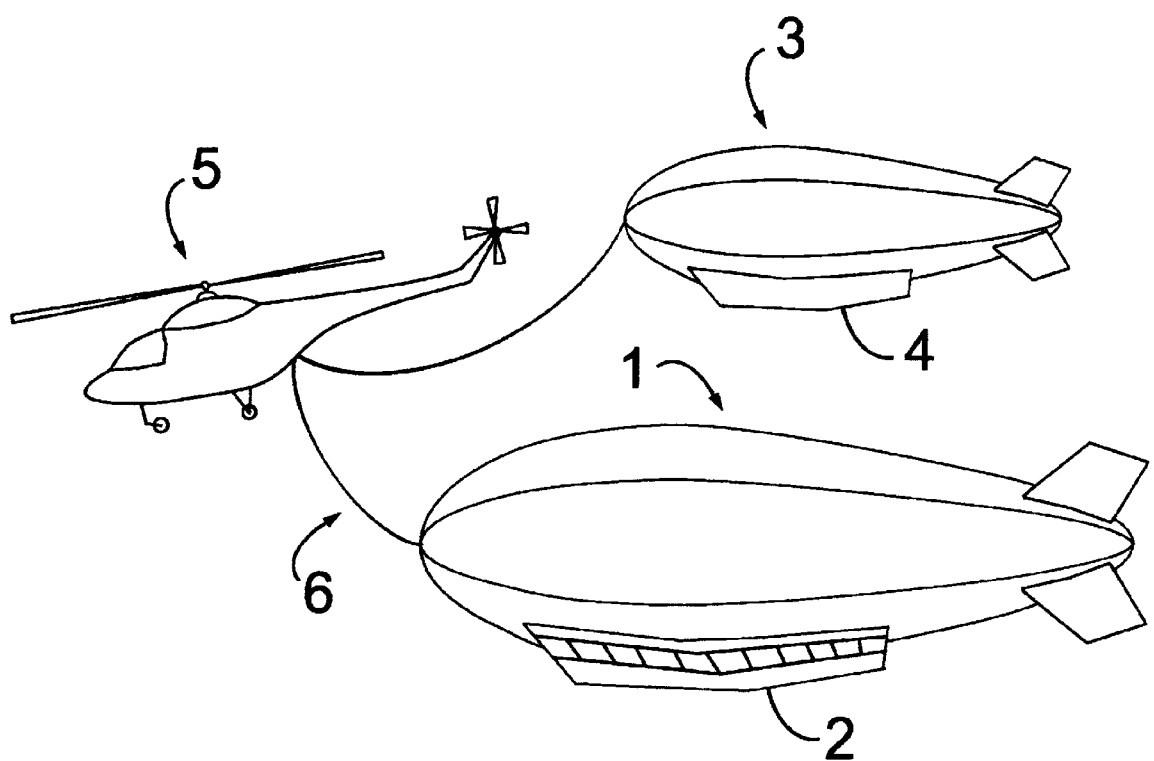
FIG. 1 shows one embodiment of a mass commercial air transportation technology of the type described herein. It illustrates the operation of airtrailers driven by a powered aircraft (helicopter).

One embodiment of the invention, in FIG. 1, shows a passenger powerless airliner (1) lighter than air containing a passenger cabin (2) for accommodating flight occupants, and a cargo powerless airtrailer (3) lighter than air containing a cargo hold (4) for placing cargo including baggage of the occupants. Both airtrailers are driven by a powered aircraft (helicopter 5) through linking means (6) from a departure to a destination field.

Figure 2:
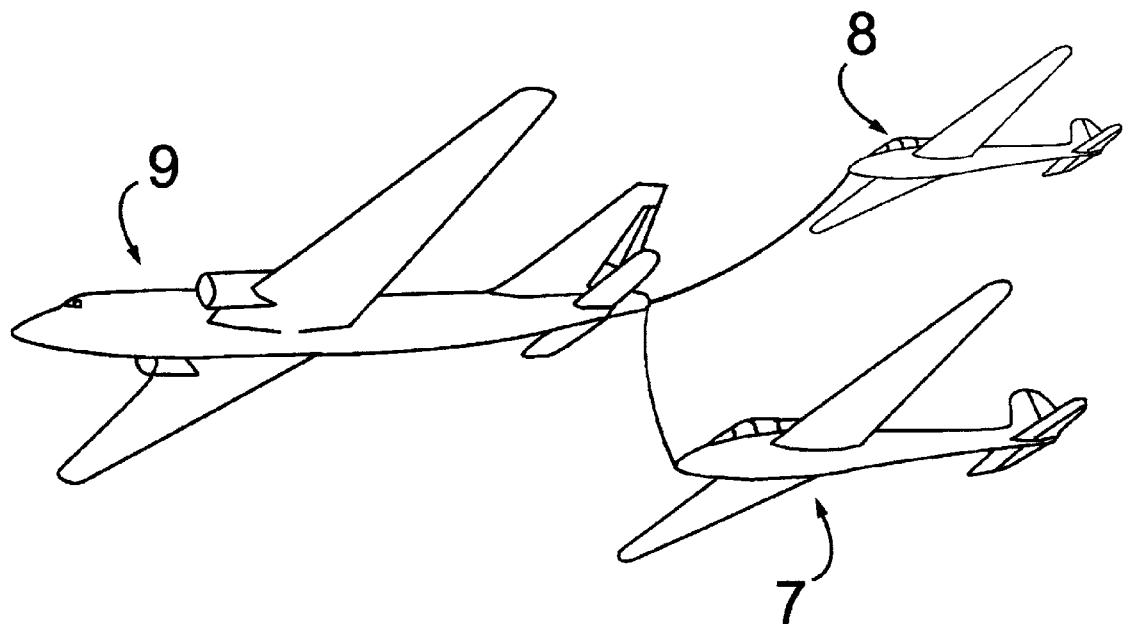
FIG. 2 shows another embodiment of a mass commercial air transportation technology of the type described herein. It illustrates the operation of gliders driven by a powered airplane.

Another embodiment of the invention, in FIG. 2, shows a passenger glider (7) accomodating flight occupants aboard, and a cargo glider (8) carrying cargo including baggage of the occupants. Both gliders are driven by a powered airplane (9) through linking means (10) from a departure to destination field.

Since, experimentally, weakening an impact of explosion is proportional to increasing a distance from its epicenter approximately to the power 3, the most effective and reliable defense against such impact is sufficiently remote position of object defended from the epicenter. So, positioning the object in the remote location provides eliminating or, at least, mitigating dramatically damages from the explosion. While I believe that weakening an impact of explosion occurs proportionally about a distance cubed, I don't wish to be bound by this.

Also, exploding inside a close structure is far more dangerous to the structure than exploding outside it, owing to application to the structure, when exploding inside, all explosive energy, otherwise disseminated mostly in aerospace.

So, one embodiment of my method to eliminate or, at least, mitigate dramatically the impact of explosion in a cargo hold of a passenger airplane or any aircraft, comprises separating the cargo hold (4) sufficiently far beyond the airplane or aircraft (5), and placing the cargo hold (4) into at least one cargo airtrailer (3) towed by the airplane so that baggage and cargo are carried in the cargo airtrailer (3). An immense glider(s) (7), having enough capacity for transporting needed amount of cargo, can serve as the airtrailer (3).

Not only does it provide full security for passengers and crew, such airtrailer has the added economic benefits of:
- the use of the former cargo hold room to accommodate more passengers;
- the lower unit cost of volume for the cargo airtrailer compared to the passenger airliner;
- the possible use of the airtrailer for carrying extra fuel;
- simplifying the procedure and saving efforts, time, and money for the baggage check.

Machinery involved in this aerotransportation technology comprises the tag airplane, linking cable(s), and, at least one, cargo airtrailer in the form of the glider(s).

OPERATION OF INVENTION

Before the flight, the airplane (9) fuels, the passengers including additional ones in the former place of the cargo hold are seated, their baggage and cargo are loaded separately in the cargo aerotrailer(s) in the form of the immense glider(s) (8). Then the glider(s) is linked—if it wasn't already—to the airplane by linking cable(s) (10), and all together they taxi to a runway, increase speed, take off, fly, and land. The airtrailer(s) (1, 3) or glider(s) (7, 8) can be taxied independently by a towing ground truck.

After linking to the airplane, during further route, the glider(s) (8) is controlled remotely by, for example, a co-pilot of the airplane with electrical glider controls powered, say, by the airplane through the connecting cable (s) (10). Observation can be provided by videocamera(s) either on the glider (8), or on the airplane (9), or both, transmitting information about surrounding situation to co-pilot's monitor(s).

When landing, the glider(s) (8) can provide additional braking force for the airplane (9) to reduce overall distance of landing.

CONCLUSION, RAMIFICATIONS, AND SCOPE OF INVENTION

Thus, owing to separating the cargo hold and placing it into cargo glider(s) sufficiently far beyond the airplane to create a safe distance from a epicenter of possible explosion in the cargo hold glider(s), and additional space for passengers seating aboard the airplane, the safe passenger aerotransportation technology provides eliminating or, at least, mitigating dramatically the impact of explosion in the cargo hold of the passenger airplane, and accommodating concurrently additional passengers aboard.

Since the technology satisfies the vital wants and needs of society for civil aviation security; increases the seating capacity on the airliner; enables savings in costs of the baggage carriage; enlarges on nonstop flight ranges; and lessens expenditures and inconvenience of time-consuming baggage check, this method of aerotransportation is far and away a very promising advance.

While this above description contains many specifities, these should not be construed as limiting the scope of my method, but rather as providing illustrations of some of the presently preferred embodiments thereof.

Many variations are possible. For example, the cargo glider(s) can also carry additional supply of fuel for the airplane to enlarge a nonstop flight range; the cargo glider itself can accommodate some passengers providing the existing flight without noise and vibration; and airplane can hook up the loaded cargo glider when flying at a low altitude above the ground the glider is waiting on; the airplane can unfasten the cargo glider(s), manned or unmanned, at the glider destination for landing on its own, without landing the airplane itself. In view of short landing distance and modest mass for the glider, the passenger airlines can serve as tag carriers of the gliders for small town destinations which cannot accept big planes, but where gliders are acceptable.

Another version of my method can be use of the airplane itself for just the placement of engines, fuel, and cargo, and placing all passenger in the silent calm passenger glider(s), i.e. creating an aerotrain with single gliders for different destinations and purposes, for instance, for carrying baggage or mail. The gliders can be linked to the tag airplane either in parallel, in series, or both.

The known constructive features of a cargo hold to make it bomb-proof can be applied to the cargo glider with far better effectiveness and reliability, owing to a distance between the airplane and the epicenter of explosion, and independence of the airplane from destruction, damage, or impairing of the cargo glider on explosion in the glider, i.e. transforming explosion from inside to outside for the airplane. Thus the scope of my method should be determined by the appended claims and their legal equivalents rather than by the embodiments described.

I claim:

1. A method of ensuring aviation security for flight occupants aboard a powered passenger aircraft against an impact of explosion or fire of contents, including baggage of said occupants, in a cargo hold of said powered aircraft containing said flight occupants, comprising displacing said contents, including baggage of said occupants, into at least one cargo airtrailer carrying no flammable fuel aboard, flying far sufficiently from and driven by said powered passenger aircraft from the airtrailer's departure to a destination landing field, providing connection of said at least one cargo airtrailer, said at least one cargo airtrailer selected from the group consisting of airtrailers heavier and lighter than air, said at least one cargo airtrailer further selected from the group consisting of piloted and unpiloted airtrailers, to said powered passenger aircraft, by linking means, thereby eliminating or mitigating significantly and impact on said flight occupants.

2. The method of claim 1, wherein said at least one cargo airtrailer is in the form of a glider driven by said powered aircraft, selected from the group consisting of airplanes and helicopters.

3. The method of claim 1, further including accommodating additional fuel aboard said powered passenger aircraft into space vacated by the displaced cargo hold, thereby enlarging a nonstop flight range.

4. The method of claim 1, wherein said at least one more additional fuel airtrailer flying apart far sufficiently from said at least one cargo airtrailer and said powered aircraft, and driven by said powered aircraft, carries a supply of fuel for said powered aircraft, said powered aircraft making a significantly long trip, snatching up en route on its way said at least one additional fuel airtrailer, apart from said at least one cargo airtrailer containing passengers' baggage, from at least one departure field by said linking means when passing aloft at a sufficiently low altitude above said departure field said at least one additional fuel airtrailer is waiting on, towing and receiving fuel from, and releasing said at least one additional fuel airtrailer, after transferring fuel, for landing on at least one destination field on its own, without landing the powered aircraft at this location, thereby enlarging a nonstop flight range and enhancing onboard security against explosion or fire.

5. The method of claim 1, further including said powered aircraft snatching up en route on its way at least one more additional cargo airtrailer, apart from said at least one cargo airtrailer containing passengers' baggage, from at least one departure field by said linking means when passing aloft at a sufficiently low altitude above said departure field, said at least one additional cargo airtrailer, selected from the group consisting of piloted and unpiloted airtrailers, towing said at least one additional cargo airtrailer to at least one destination field, and releasing said at least one additional cargo airtrailer for landing on its own, without landing the powered aircraft at this location.

6. The method of claim 1, further including accommodating additional fuel aboard said powered passenger aircraft into space vacated by the displaced cargo hold, thereby enlarging sitting capacity of said powered passenger aircraft.

7. The method of claim 1, further including accommodating passengers aboard said at least one cargo airtrailer carrying cargo including baggage, thereby providing the passengers exciting flight without noise and vibration.

8. A method of ensuring safety and security of commercial air transportation for flight occupants against an impact of explosion or fire of contents, including baggage of said occupants, in a cargo hold of a powered aircraft, menacing technical malfunction or failure of said powered aircraft, or a human error, comprising displacing said occupants without their baggage into at least one passenger airtrailer, and displacing at least part of said contents including baggage of said occupants, into at least one cargo airtrailer, said at least one passenger airtrailer and at least one cargo airtrailer carrying no flammable fuel aboard, flying far sufficiently from each other and said powered aircraft, and driven by said powered aircraft from their at least one departure field to at least one destination landing field, providing connection, by linking means, of said airtrailers, selected from the group consisting of airtrailers heavier and lighter than air, said airtrailers further selected from the group consisting of piloted and unpiloted airtrailers, to said powered aircraft, thereby eliminating all or, at least, mitigating significantly said impact on said flight occupants and serving them with exciting flight without noise and vibration through said separating said flight occupants from baggage and engines with fuel, and providing additional space vacated aboard said powered aircraft.

9. The method of claim 8, wherein said at least one passenger airtrailer and said at least one cargo airtrailer in the form of a glider, selected from the group consisting of piloted and unpiloted gliders, are driven by said powered aircraft, which is selected from the group consisting of airplanes and helicopters.

10. The method of claim 8, further including loading additional fuel aboard said powered aircraft into space vacated by the displaced occupants and contents of cargo hold, including baggage of said occupants, thereby enlarging a nonstop flight range.

11. The method of claim 8, wherein at least one more additional fuel airtrailer flying apart far sufficiently from said passenger and cargo airtrailers and said powered aircraft, and driven by said powered aircraft, carries a supply of fuel for said powered aircraft, said powered aircraft making a significantly long trip, snatching up en route on its way said at least one additional fuel airtrailer, apart from said at least one passenger airtrailer and said at least one cargo airtrailer containing passengers' baggage, from at least one departure field by said linking means when passing aloft at a sufficiently low altitude above said departure field said at least one additional fuel airtrailer is waiting on, towing and receiving fuel from, and releasing said at least one additional fuel airtrailer, after transferring fuel, for landing on at least one destination fuel on its own, without landing the powered aircraft at this location, thereby enlarging a nonstop flight range and enhancing onboard security against explosion or fire.

12. The method of claim 8, further including said powered aircraft snatching up en route on its way at least one more additional airtrailer, apart from said passenger and cargo airtrailers being already towed aloft, from at least one departure field, said at least one more additional airtrailer flying far sufficiently from said passenger and cargo airtrailers and said powered aircraft, providing connection of said at least one more additional airtrailer to said powered aircraft by said linking means when passing aloft at a sufficiently low altitude above said at least one departure field said at least one additional airtrailer is waiting on, towing said at least one additional airtrailer to least one destination field, and releasing said at least one additional airtrailer for landing on its own, without landing the powered aircraft and said passenger and cargo airtrailers at this location, thereby providing direct, fast, and convenient passenger and cargo, including the passengers' baggage, delivering among smaller intermediate destinations along the powered aircraft's route.

13. The method of claim 8, further including carrying at least a part of said contents, including a least baggage of said occupants, aboard said powered aircraft.

* * * * *